(12) United States Patent
Yen

(10) Patent No.: US 9,236,754 B2
(45) Date of Patent: Jan. 12, 2016

(54) BATTERY MODULE

(71) Applicant: Quanta Computer Inc., Tao Yuan Shien (TW)

(72) Inventor: Wei-Ting Yen, Taipei (TW)

(73) Assignee: QUANTA COMPUTER INC., Tao Yuan Shien (TW)

( * ) Notice: Subject to any disclaimer, the term of this patent is extended or adjusted under 35 U.S.C. 154(b) by 232 days.

(21) Appl. No.: 14/031,151

(22) Filed: Sep. 19, 2013

(65) Prior Publication Data

US 2015/0008882 A1   Jan. 8, 2015

(30) Foreign Application Priority Data

Jul. 4, 2013  (TW) .............................. 102124020 A

(51) Int. Cl.
*H02J 7/00* (2006.01)
(52) U.S. Cl.
CPC ..................................... *H02J 7/007* (2013.01)
(58) Field of Classification Search
CPC ....................................................... H02J 7/007

USPC ......................................................... 320/132
See application file for complete search history.

(56) References Cited

U.S. PATENT DOCUMENTS

2012/0049802 A1*  3/2012  Barsukov et al. ............. 320/136

* cited by examiner

*Primary Examiner* — Thuan Do
(74) *Attorney, Agent, or Firm* — Rabin & Berdo, P.C.

(57) ABSTRACT

A battery module is provided. The battery module includes a battery set, a voltage measurement unit, a temperature measurement unit, a matrix calculation unit and a mix algorithm unit. The voltage measurement unit measures a voltage matrix of the battery set. The temperature measurement unit measures a temperature of the battery set. The matrix calculation unit calculates a norm of the voltage matrix. The mix algorithm unit reduces a remaining capacity of the battery module by a first predetermined rate if the change of the norm is larger than a predetermined value and the rise of temperature is larger than a predetermined difference for a predetermined time, and reduces the remaining capacity of the battery module by a second predetermined rate if the change of the norm is larger than the predetermined value and the rise of temperature is not larger than the predetermined difference.

10 Claims, 5 Drawing Sheets

BATTERY MODULE

This application claims the benefit of Taiwan application Serial No. 102124020, filed Jul. 4, 2013, the subject matter of which is incorporated herein by reference.

BACKGROUND OF THE INVENTION

1. Field of the Invention

The invention relates in general to a battery module, and more particularly to a charge/discharge battery module.

2. Description of the Related Art

In general, the calculation of battery capacity is usually accompanied with calculation defects, leading to poor accuracy or fluctuating capacities. Under the circumstance that the indication of battery capacity almost drops to 0%, the indication of battery capacity may suddenly surge to be larger than 30% once the battery module is connected to a power connector. Or, under such circumstance that the indication of battery capacity is about 50%, the indication of battery capacity may suddenly plunge to 0% immediately after the electronic device performs a simple program.

The chip for detecting battery capacity may adopt the end of discharge voltage (EDV) method or the impedance tracking (IT) method. Since above methods do not take the characteristics of the battery body and external environment into consideration, the obtained calculation of battery capacity is thus inaccurate.

SUMMARY OF THE INVENTION

The invention is directed to a battery module, which performs calculation according to the battery body and the ambient characteristics so as to increase the accuracy in the measurement of the battery module.

According to one embodiment of the present invention, a battery module is provided. The battery module includes a battery set, a voltage measurement unit, a temperature measurement unit, a matrix calculation unit and a mix algorithm unit. The battery set is discharged. The voltage measurement unit is used for measuring a voltage matrix of the battery set. The temperature measurement unit is used for measuring a temperature of the battery set. The matrix calculation unit is used for calculating a norm of the voltage matrix. If the change of the norm is larger than a predetermined value and the rise of temperature is larger than a predetermined increment for a predetermined time, then the mix algorithm unit reduces a remaining capacity (RC) of the battery module by a first predetermined rate. If the change of the norm is larger than the predetermined value and the rise of temperature is not larger than the predetermined increment, then the mix algorithm unit reduces the remaining capacity of the battery module by a second predetermined rate.

The above and other aspects of the invention will become better understood with regard to the following detailed description of the preferred but non-limiting embodiment(s). The following description is made with reference to the accompanying drawings.

DETAILED DESCRIPTION OF THE INVENTION

Figure 1:
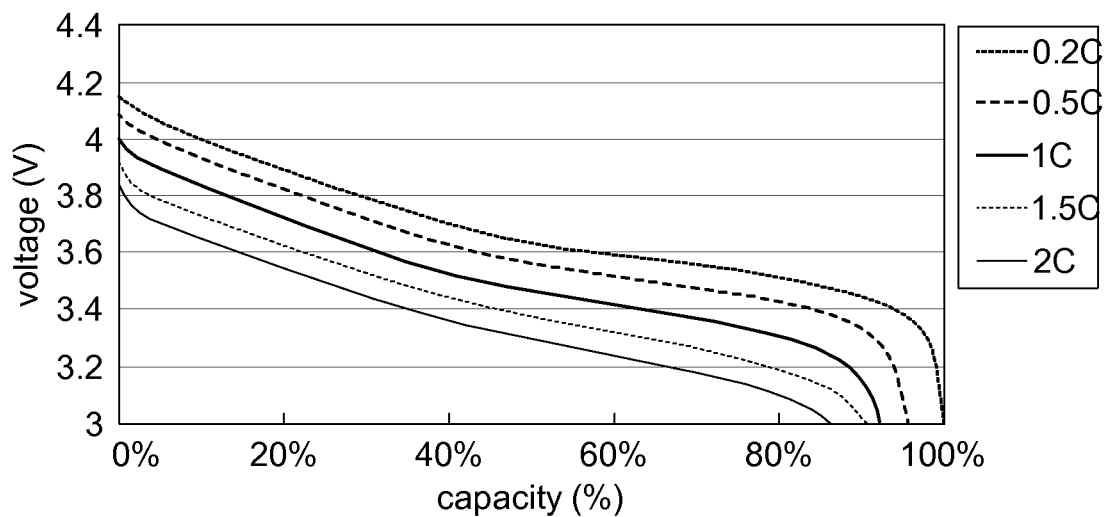
FIG. 1 is a diagram of voltage vs. capacity curves of battery under different loads.

Referring to FIG. 1, a diagram of voltage vs. capacity curves of battery under different loads is shown. The five curves illustrate the voltage vs. capacity curves of battery under the loads of 2 C, 1.5 C, 1 C, 0.5 C, and 0.2 C respectively. Under different loads, the voltage vs. capacity curves of battery are not consistent, and the higher the load, the lower the capacity. Once the load is lifted, the battery will suddenly surge to a high capacity from a low capacity, hence making the calculation of battery capacity inaccurate. Moreover, the voltage vs. capacity curves of battery are not linear curves, and cannot be easily estimated or predicted. As indicated in the diagram, the capacity loss between the best and the worst performance is up to 15%.

Figure 2:
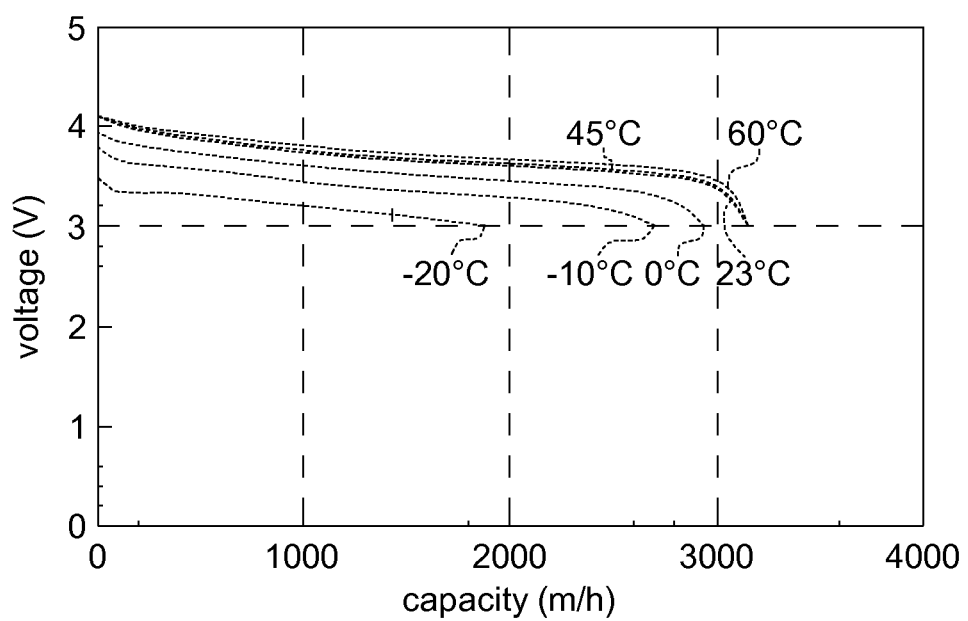
FIG. 2 is a diagram of voltage vs. capacity curves of battery under different temperatures.

Referring to FIG. 2, a diagram of voltage vs. capacity curves of battery under different temperatures is shown. The five curves illustrate the voltage vs. capacity curves of battery under the temperatures of $-20°$ C., $-10°$ C., $0°$ C., $23°$ C., $45°$ C., and $60°$ C. respectively. Under different temperatures, the voltage vs. capacity curves of battery are not consistent, and the higher the temperature, the higher the capacity. Once the temperature changes, battery capacity will have different results, hence making the calculation of battery capacity inaccurate. Moreover, the voltage vs. capacity curves of battery are not a linear curve, and cannot be easily estimated or predicted.

Figure 3:
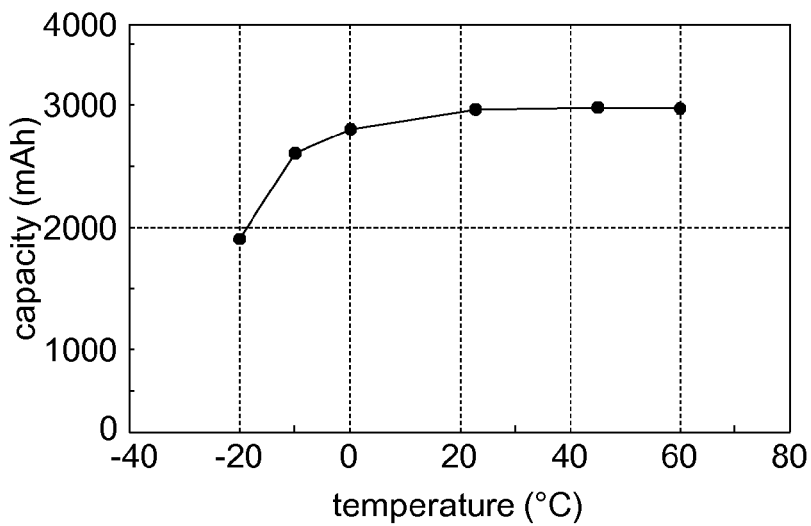
FIG. 3 is a diagram of a temperature vs. capacity curve of battery.

Referring to FIG. 3, a diagram of a temperature vs. capacity curve of battery is shown. It can be clearly seen from FIG. 3 that battery capacity has significant change when the temperature is between $-20°$ C. and $0°$ C. Such change will make the calculation of battery capacity inaccurate. Moreover, the temperature and voltage curve of battery is not a linear curve, and cannot be easily estimated or predicted.

Figure 4:
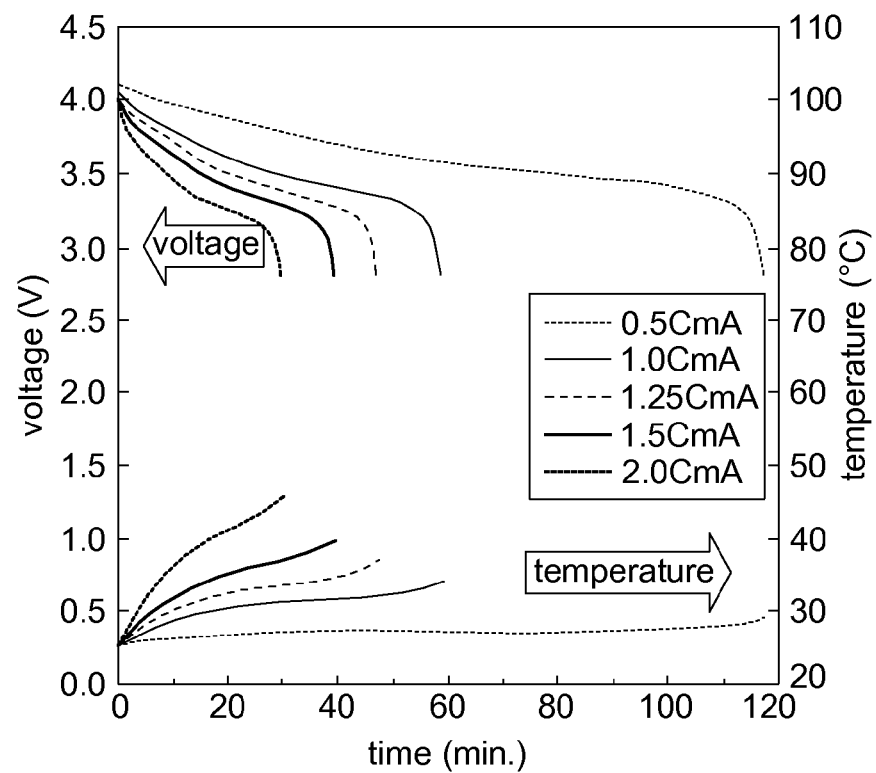
FIG. 4 is a diagram of voltage change curves and temperature change curves of battery indicating how voltage and temperature vary with time under different loads.

Referring to FIG. 4, a diagram of voltage change curves and temperature change curves of battery indicating how voltage and temperature vary with time under different loads is shown. Under different loads, the voltage change curves of battery indicating how voltage varies with time are not consistent, and the higher the load, the larger the voltage drop. Such situation will make the calculation of battery capacity inaccurate. The voltage change curves of battery indicating how voltage varies with the time are not linear curves, and cannot be easily estimated or predicted. On the other hand, under different loads, the temperature change curves of battery indicating how temperature varies with time are not consistent, and the higher the load, the larger the temperature rise. Such situation will make the calculation of battery capacity inaccurate. The temperature change curves of battery indicating how temperature varies with the time are not linear curves, and cannot be easily estimated or predicted.

Figure 5:
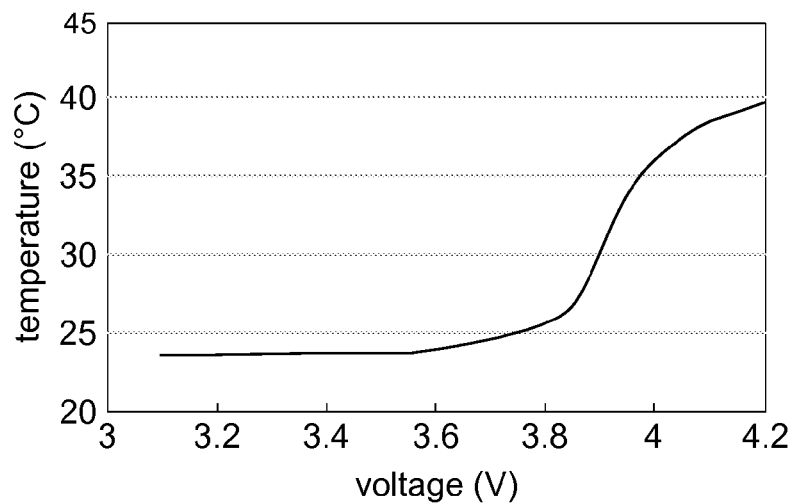
FIG. 5 is a diagram of voltage vs. temperature curve of battery.

Referring to FIG. 5, a diagram of voltage vs. temperature curve of battery is shown. Judging from the relationship between voltage and temperature, the voltage and the temperature curve is not a linear curve, and cannot be easily estimated or predicted.

Referring to Table 1, a table of battery discharge records is shown. The shipping charge is 3.84 volts (V), and the full charge is 4.2V. For instance, after the battery with shipping charge (3.84V) is stored for 1 month under the condition of 25° C., the voltage of battery will drop to 3.833V from 3.84V (3.833V is obtained by deducting 0.007V from 3.84 V).

TABLE 1

Battery Discharge Records

| Period | Storage Conditions | Voltage Drop | | |
|---|---|---|---|---|
| | | 25° C. | 45° C. | 60° C. |
| 1 Month | Shipping Charge | −0.007 | −0.014 | −0.063 |
| | Full Charge | −0.023 | −0.052 | −0.080 |
| 3 Month | Shipping Charge | −0.011 | −0.035 | −0.310 |
| | Full Charge | −0.039 | −0.074 | −0.104 |

Since the internal chemical characteristics are inconsistent, the impedances of battery are different. If the impedance of battery is small and the battery is externally connected to a small load, then the voltage allocated to the battery will be small. Conversely, if the battery is externally connected to a large load, then a larger voltage will be allocated to the battery, and a part of the power will be depleted on the impedance (the power may be converted to heat or used for some complicated reverse electrochemical reactions). In general, the battery has smaller impedance when it is unused. After a period of use, the electrolyte of the battery will dry out, the activity of chemical substances inside the battery will drop, and the impedance will gradually increase. When the impedance grows to such an extent that the power of the battery cannot be released normally, the battery will be flat for good.

To summarize, the capacity of the battery is subjected to the complicated interactions between voltage, temperature, load, impedance and other factors, and the calculation of battery capacity is thus inaccurate. After carefully studying the above factors through experiments, a battery module and an accuracy calibration method thereof are disclosed in the present embodiment to increase the accuracy in the calculation of battery capacity.

Figure 6:
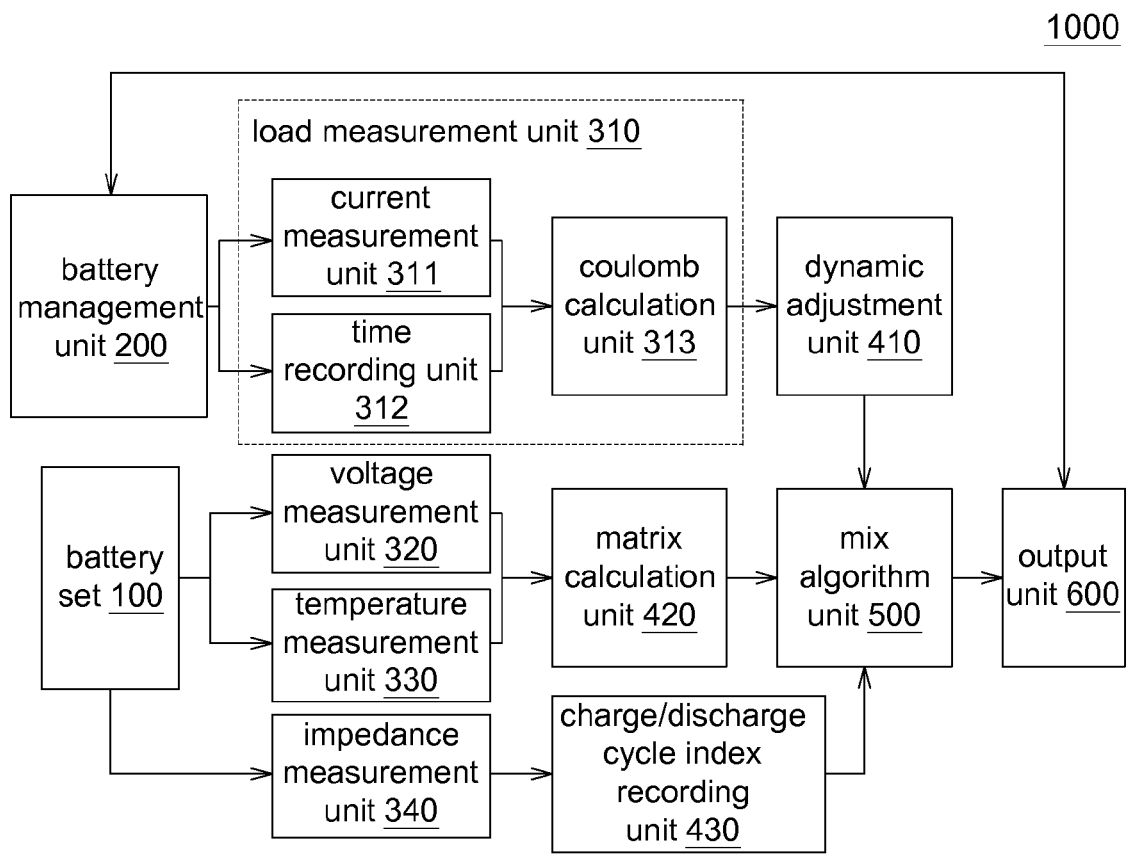
FIG. 6 is a schematic diagram of a battery module according to an embodiment of the present invention.

Referring to FIG. 6, a schematic diagram of a battery module 100 according to an embodiment of the present invention is shown. The battery module 1000 includes a battery set 100, a battery management unit 200, a load measurement unit 310, a voltage measurement unit 320, a temperature measurement unit 330, an impedance measurement unit 340, a dynamic adjustment unit 410, a matrix calculation unit 420, a charge/discharge cycle index recording unit 430, a mix algorithm unit 500 and an output unit 600.

The battery set 100 is a charge battery capable of performing many times of charge and discharge procedures, and can be realized by such as a nickel-cadmium (Ni—Cd) battery, a nickel-metal hydride (Ni-MH) battery, a lithium-Ion battery, a lithium iron phosphate (LiFePO4) battery or an accumulator battery.

The battery management unit 200 is used for managing and controlling the charge and discharge procedures of battery, and can be realized by such as a control chip, a firmware circuit, a control circuit board and a computer-readable recording medium storing several programming codes.

The load measurement unit 310, the voltage measurement unit 320, the temperature measurement unit 330 and the impedance measurement unit 340 are used for measuring the load, the voltage, the temperature and the impedance of the battery set 100 respectively. The load measurement unit 310, the voltage measurement unit 320, the temperature measurement unit 330 and the impedance measurement unit 340 can be realized by such as a chip set, a firmware circuit, a control circuit and a passive element respectively.

After receiving particular data, the matrix calculation unit 420 and the mix algorithm unit 500 calculate and compute the data to output a calculation result. The matrix calculation unit 420 and the mix algorithm unit 500 can be realized by such as a control chip, a firmware circuit, a control circuit board or a computer-readable recording medium storing several programming codes.

The charge/discharge cycle index recording unit 430 is used for recording and providing a charge/discharge cycle index, and can be realized by such as a register, a memory or a hard disk.

The output unit 600 is used for outputting a calculation result, and can be realized by such as a signal connection line, a display, a printer or a speaker.

The voltage measurement unit 320, the temperature measurement unit 330, the matrix calculation unit 420 and the mix algorithm unit 500 are used for calibrating the accuracy for the battery set 100 according to the voltage and the temperature. The impedance measurement unit 340, the charge/discharge cycle index recording unit 430 and the mix algorithm unit 500 are used for calibrating the accuracy for the battery set 100 according to the impedance. The load measurement unit 310 and the dynamic adjustment unit 410 are used for calibrating the accuracy for the battery set 100 according to the load. The above three accuracy calibration procedures are disclosed below with accompanying flowcharts respectively.

Figure 7:
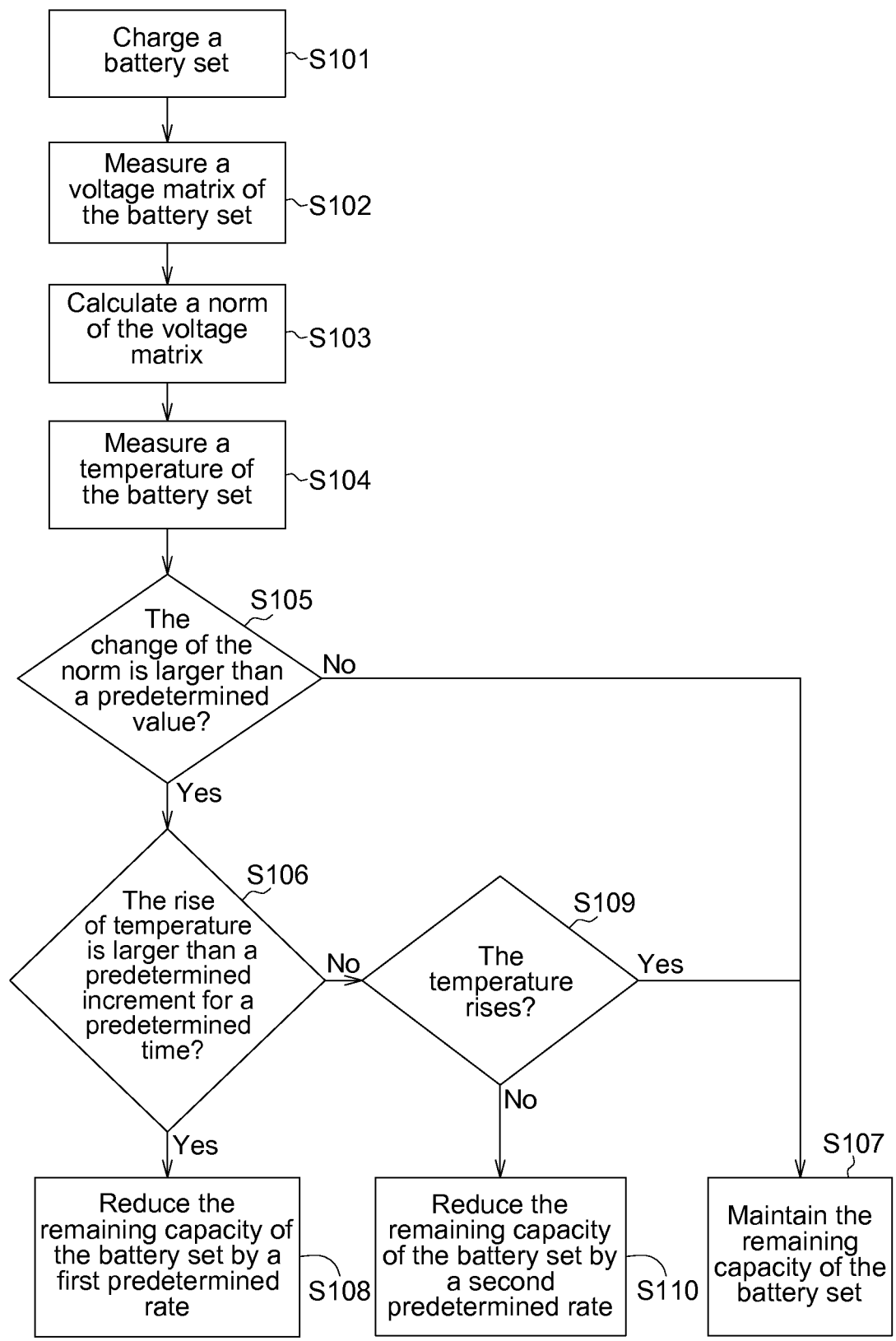
FIG. 7 is a flowchart of remaining capacity (RC) calibration according to an accuracy calibration method of a battery module.

Referring to FIG. 7, a flowchart of remaining capacity (RC) calibration according to an accuracy calibration method of a battery module 1000 is shown. It can be known from the above analysis of experiment that voltage and temperature affect battery accuracy. The following flowchart illustrates how the remaining capacity (RC) is calibrated by way of adjusting the voltage and the temperature.

Firstly, the method begins in step S101, the battery set 100 is charged.

In step S102, a voltage matrix of the battery set 100 is measured by the voltage measurement unit 320. For instance, the battery set 100 is such as a 3S1P battery structure with three batteries in serial and one battery in parallel. The voltages of three battery strings are respectively measured at each time interval to obtain three voltage values. After three consecutive time intervals, nine voltage values are obtained. The nine voltage values can form a voltage matrix. The time interval is such as one minute. The three voltage values of the first battery string are arranged in the first column, the three voltage values of the second battery string are arranged in the second column, and the three voltage values of the third battery string are arranged in the third column. The three voltage values of the three battery strings measured at the first time interval are arranged in the first row, the three voltage values of the three battery strings measured at the second time interval are arranged in the second row, and the three voltage values of the three battery strings measured at the third time interval are arranged in the third row. Equation (1) is an example of the voltage matrix.

$$\begin{bmatrix} 3.6 & 3.59 & 3.61 \\ 3.58 & 3.6 & 3.61 \\ 3.6 & 3.6 & 3.6 \end{bmatrix} \quad (1)$$

The measurements of voltages obtained at the first to the third time interval can form a 3×3 voltage matrix. The voltage measurement obtained at the second to the fourth time interval can form another 3×3 voltage matrix. The voltage measurement obtained at the third to the fifth time interval can form an alternate 3×3 voltage matrix. The other 3×3 voltage matrixes can be obtained by the same analogy.

Similarly, if the battery set 100 is a 3S2P battery structure with three batteries in series and two batteries in parallel or a 3S3P battery structure with three batteries in series and three batteries in parallel, then the three batteries in series are treated as one unit in the measurement of voltage, and nine voltage values can be obtained to form a 3×3 voltage matrix.

If the battery set 100 is a 4S1P battery structure with four batteries in series and one battery in parallel, then the four batteries in series are treated as one unit in the measurement of voltage, and 16 voltage values can be obtained to form a 4×4 voltage matrix.

By the same analogy, if the battery set 100 is a NSMP battery structure with N batteries in series and M batteries in parallel (N and M are natural numbers), then the N batteries in series are treated as one unit in the measurement of voltage, and N×N voltage values can be obtained to form an N×N voltage matrix.

In step S103, a norm of the voltage matrix is calculated by the matrix calculation unit 420.

In step S104, a temperature of the battery set 100 is measured by the temperature measurement unit 330.

In step S105, whether the change of the norm is larger than a predetermined value is determined by the mix algorithm unit 500. The predetermined value is such as 0.5. If the change of the norm is larger than the predetermined value, then the method proceeds to step S106. If the change of the norm is not larger than the predetermined value, then the method proceeds to step S107.

In step S106, whether the rise of temperature is larger than a predetermined increment for a predetermined time is determined by the mix algorithm unit 500. The predetermined increment is such as 3° C., and the predetermined time is such as 3 minutes. If the rise of temperature is larger than the predetermined increment for a predetermined time, then the method proceeds to step S108. If the rise of temperature is not larger than the predetermined increment for a predetermined time, then the method proceeds to step S109.

In step S109, whether the temperature rises is determined by the mix algorithm unit 500. If the temperature really rises, then the method proceeds to step S107. If the temperature does not rise, then the method proceeds to step S110.

After judgments are made in step S105, step S106 and step S109, the method proceeds to step S108, step S110 or step S107.

In step S108, the remaining capacity of the battery set 100 is reduced by the mix algorithm unit 500 by a first predetermined rate such as 5%.

In step S110, the remaining capacity of the battery set 100 is reduced by the mix algorithm unit 500 by a second predetermined rate such as 1%.

In step S107, the remaining capacity of the battery set 100 is maintained by the mix algorithm unit 500.

That is, if the change of the norm is larger than 0.5 and the rise of temperature is larger than 3° C. for 3 minutes, then the mix algorithm unit 500 reduces the remaining capacity of the battery module 1000 by 5%. If the change of the norm is larger than 0.5 and the rise of temperature is not larger than 3° C., then the mix algorithm unit 500 reduces the remaining capacity of the battery module 1000 by 1%. If the change of the norm is not larger than 0.5, then the mix algorithm unit 500 maintains the remaining capacity of the battery module 1000.

Figure 8:
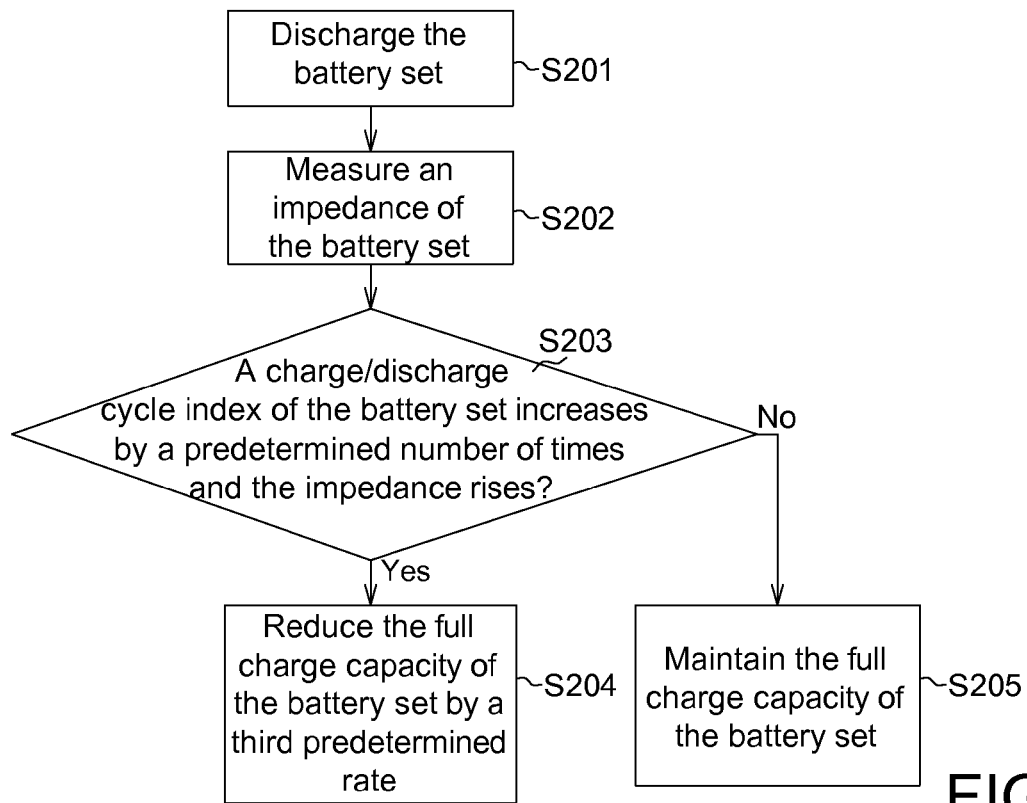
FIG. 8 is a flowchart of Full Charge Capacity (FCC) calibration according to an accuracy calibration method of a battery module.

Referring to FIG. 8, a flowchart of Full Charge Capacity (FCC) calibration according to an accuracy calibration method of a battery module 1000 is shown. It can be known from the above analysis of experiment that the impedance affects battery accuracy. The following flowchart illustrates how the full charge capacity is calibrated by way of adjusting the impedance.

Firstly, the method begins in step S201, the battery set 100 is discharged.

In step S202, an impedance of the battery set 100 is measured by the impedance measurement unit 340.

In step S203, whether a charge/discharge cycle index of the battery set 100 increases by a predetermined number of times and whether the impedance rises are determined by the mix algorithm unit 500. The predetermined number of times is such as 10. If the charge/discharge cycle index of the battery set 100 increases by a predetermined number of times and the impedance rises, then the method proceeds to step S204. If the charge/discharge cycle index of the battery set 100 does not increase by a predetermined number of times or the impedance does not rise, then the method proceeds to step S205.

In step S204, the full charge capacity of the battery set 100 is reduced by the mix algorithm unit 500 by a third predetermined rate. The third predetermined rate is such as 0.83%.

In step S205, the full charge capacity of the battery set 100 is maintained by the mix algorithm unit 500.

That is, if the charge/discharge cycle index of the battery set 100 increases for more than 10 times and the impedance really rises, then the mix algorithm unit 500 reduces the full charge capacity of the battery set 100 by 0.83%. If the charge/discharge cycle index of the battery set 100 does not increase for more than 10 times or the impedance does not rise, then the mix algorithm unit 500 maintains the full charge capacity of the battery set 100.

Figure 9:
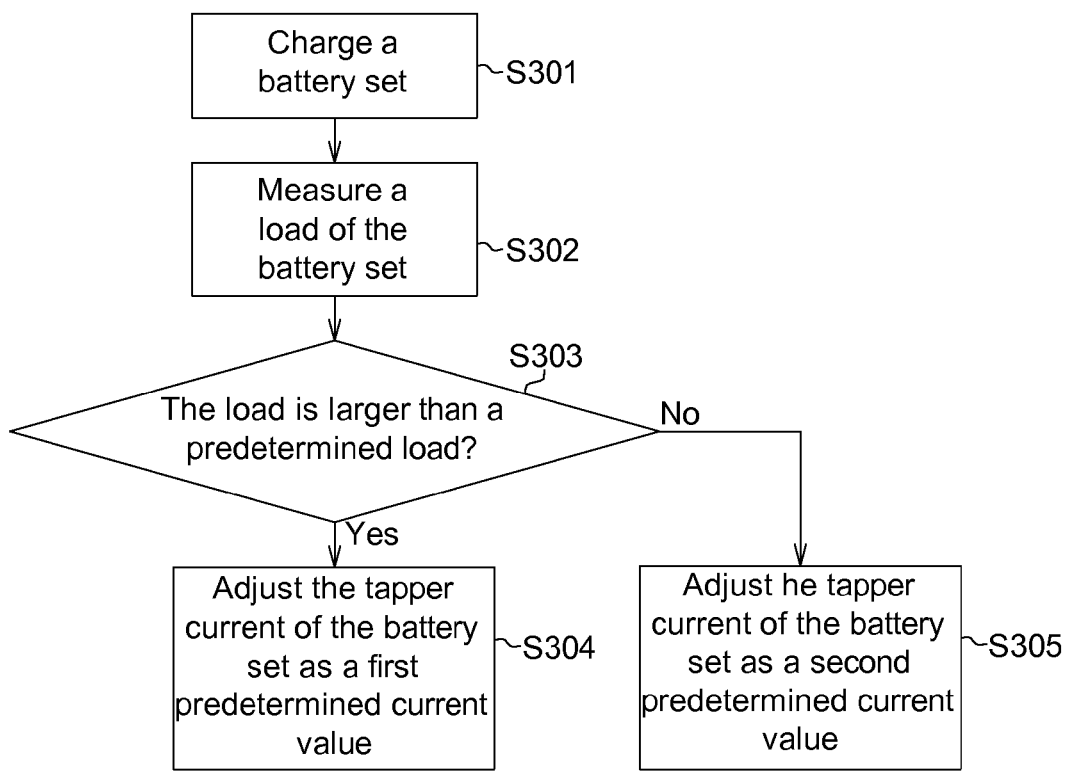
FIG. 9 is a flowchart of tapper current calibration according to an accuracy calibration method of a battery module.

Referring to FIG. 9, a flowchart of tapper current calibration according to an accuracy calibration method of a battery module 1000. It can be known from the above analysis of experiment that battery load affects battery accuracy. The following flowchart illustrates how the tapper current is calibrated by way of adjusting the load.

Firstly, the method begins in step S301, the battery set 100 is charged.

In step S302, a load of the battery set 100 is measured by the load measurement unit 310. The load measurement unit 310 includes a current measurement unit 311, a time recording unit 312 and a coulomb calculation unit 313. The current measurement unit 311 is used for measuring the current of the battery set 100. The time recording unit 312 is used for recording time. The coulomb calculation unit 133 calculates a coulomb count according to the current and the time. The load of the battery set 100 can be measured by the current measurement unit 311, the time recording unit 312 and the coulomb calculation unit 313.

In step S303, whether the load is larger than a predetermined load is determined by the dynamic adjustment unit 410. The predetermined load is 3 amperes (A). If the load is larger than the predetermined load, then the method proceeds to step S304. If the load is not larger than the predetermined load, then the method proceeds to step S305.

In step S304, the tapper current of the battery set 100 is adjusted as a first predetermined current value by the dynamic adjustment unit 410. The first predetermined current value is such as 300 milliamperes (mA).

In step S305, the tapper current of the battery set 100 is adjusted as a second predetermined current value by the dynamic adjustment unit 410. The second predetermined current value is such as 100 mA.

That is, if the load is larger than 3 A, then the dynamic adjustment unit 410 adjusts the tapper current of the battery set 100 as 300 mA. If the load is not larger than 3 A, then the dynamic adjustment unit 410 adjusts the tapper current of the battery module 1000 as 100 mA.

Through the above calibration procedures, the mix algorithm unit 500 can obtain the calibrated relative state of charge (RSOC) according to the calibrated remaining capacity (RC) and full charge capacity, and further confirms the state of the battery according to the calibrated tapper current. After collecting the data to the battery management unit 200, the battery module 1000 can be accurately controlled and managed.

While the invention has been described by way of example and in terms of the preferred embodiment(s), it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A battery module, comprising:
   a battery set;
   a voltage measurement unit, used for measuring a voltage matrix of the battery set;
   a temperature measurement unit, used for measuring a temperature of the battery set;
   a matrix calculation unit, used for calculating a norm of the voltage matrix; and
   a mix algorithm unit, wherein during a discharge of the battery set, the mix algorithm unit reduces a remaining capacity (RC) of the battery module by a first predetermined rate if the change of the norm is larger than a predetermined value and the rise of temperature is larger than a predetermined increment for a predetermined time, and reduces the remaining capacity of the battery module by a second predetermined rate if the change of the norm is larger than the predetermined value and the rise of temperature is not larger than the predetermined increment.

2. The battery module according to claim 1, wherein the battery set comprises N battery strings, and the voltage measurement unit measures each battery string to obtain a voltage value at each time interval to result an N×N voltage matrix.

3. The battery module according to claim 2, wherein the time interval is 1 minute.

4. The battery module according to claim 1, wherein the predetermined value is 0.5.

5. The battery module according to claim 1, wherein the predetermined increment is 3° C.

6. The battery module according to claim 1, wherein the predetermined time is 3 minutes.

7. The battery module according to claim 1, wherein the first predetermined rate is 5%.

8. The battery module according to claim 1, wherein the second predetermined rate is 1%.

9. The battery module according to claim 1, further comprising:
   an impedance measurement unit, used for measuring an impedance of the battery module; and
   a charge/discharge cycle index recording unit, used for recording a charge/discharge cycle index of the battery set;
   wherein the mix algorithm unit reduces a full charge capacity (FCC) of the battery set by a third predetermined rate if a charge/discharge cycle index of the battery set increases for a predetermined number of times and the impedance rises.

10. The battery module according to claim 1, wherein the battery set is charged, and the battery module further comprises:
    a load measurement unit, used for measuring a load of the battery module; and
    a dynamic adjustment unit, wherein the dynamic adjustment unit adjusts a tapper current of the battery set as a first predetermined current value if the load is larger than a predetermined load, and adjusts the tapper current of the battery module as a second predetermined current value if the load is not larger than the predetermined load.

* * * * *